United States Patent [19]

Sano et al.

[11] Patent Number: 4,470,144
[45] Date of Patent: Sep. 4, 1984

[54] COAXIAL-TYPE CARBON DIOXIDE GAS LASER OSCILLATOR

[75] Inventors: Reiji Sano, Kawasaki; Yasuyuki Morita, Yokohama; Yoshikazu Kawauchi, Kawasaki; Minoru Kimura; Hidemi Takahashi, both of Kawasaki, all of Japan

[73] Assignee: Matsushita Electric Industrial Company, Limited, Osaka, Japan

[21] Appl. No.: 379,505

[22] Filed: May 18, 1982

[30] Foreign Application Priority Data

May 18, 1982 [JP] Japan .................................. 56-75215

[51] Int. Cl.$^3$ .............................................. H01S 3/03
[52] U.S. Cl. ........................................ 372/61; 372/58; 372/87
[58] Field of Search ................... 372/58, 61, 87, 55, 372/29, 81

[56] References Cited

U.S. PATENT DOCUMENTS 4,287,487 8/1981 Kuwabara et al. .................... 372/58
4,351,052 8/1982 Sasaki et al. ............................ 372/58

Primary Examiner—William L. Sikes
Assistant Examiner—Léon Scott, Jr.
Attorney, Agent, or Firm—Lowe, King, Price & Becker

[57] ABSTRACT

A coaxial-type carbon dioxide gas laser includes an oscillator comprising a gas inlet for introducing gas into a discharge tube through a gas supply chamber having a hollow cylindrical body which serves to disturb the gas flow and orientate the gas toward the discharge tube via a space defined between the discharge tube and the hollow cylindrical body. The gas which has been subjected to an electrical discharge is drawn out of the discharge tube through a chamber and a gas outlet connected therewith. A pair of anode and cathode electrodes are disposed adjacent to the ends of the discharge tube. One of the electrodes is mounted on the gas supply chamber and is annular in shape. The gas supply chamber and the hollow cylindrical body jointly define a gap for passage therethrough of the gas fed from the gas inlet toward the discharge tube via the space. The space is large in cross section than the gap. The discharge tube has an inside cross-sectional area smaller than an outside cross-sectional area and larger than the cross-sectional area of the gap.

15 Claims, 5 Drawing Figures

COAXIAL-TYPE CARBON DIOXIDE GAS LASER OSCILLATOR

BACKGROUND OF THE INVENTION

The present invention relates to a coaxial-type carbon dioxide gas laser oscillator.

More widespread use of lasers requires that they be of high performance and smaller in size while being capable of operating in a single fundamental mode. Coaxial-type lasers, in which three axes, that is, the optical axis of a resonator, the direction in which an electrical discharge takes place or a DC electric field is applied, and the direction in which a laser gas flows, are aligned with each other, have been designed to enable the laser gas to flow at high speeds for gaining highperformance operation of the laser. However, mere attempts to cause the gas to travel rapidly through a discharge tube have proven unsuccessful in achieving high performance of the laser. For example, prior pin-shaped anodes have prevented a gas stream from being symmetrically distributed around an optical axis of the oscillator, thus failing to carry out laser operation in a fundamental mode. The pin-shaped anodes are also disadvantageous in that they allow areas to be created in the discharge tube which are not responsible for an electrical discharge in the gas in the discharge tube. Furthermore, known laser oscillators have relatively large gas blower for maintaining the gas flow properly disturbed and accomplishing a stable discharge in the gas.

SUMMARY OF THE INVENTION

It is an object of the present invention to provide a coaxial-type carbon dioxide laser oscillator for producing a stable laser output in a fundamental mode or a mode approximating such a fundamental mode.

Another object of the present invention is to provide a coaxial-type carbon dioxide laser oscillator which is relatively small in size.

According to the present invention, a coaxial-type carbon dioxide laser oscillator comprises a discharge tube, a gas supply chamber connected to one end of the discharge tube, a gas inlet coupled to the gas supply chamber for introducing gas into the discharge tube through the gas supply chamber, a chamber connected to the other end of the discharge tube, and a gas outlet connected to the latter chamber for drawing the gas from the discharge tube. A pair of annular electrodes are mounted one on the gas supply chamber and the other in the other chamber, for causing an electrical discharge in the discharge tube. The gas supply chamber includes a coaxial hollow cylindrical body for disturbing the gas flow as it goes from the the gas inlet toward the discharge tube via a space defined in the gas supply chamber between the hollow cylindrical body and the discharge tube. The gas supply chamber has an inner wall surface and the hollow cylindrical body has an outer wall surface, and the inner and outer wall surfaces jointly define a gap for passage therethrough of the gas while being fed to the discharge tube. The gap has a cross-sectional area which is smaller than that of the space between the hollow cylindrical body and the discharge tube. The discharge tube has an inside cross-sectional area smaller than an outside cross-sectional area of the hollow cylindrical body and larger than the cross-sectional area of the gap. With this arrangement, the gas as it flows through the gas supply chamber is properly disturbed, and thermally insulated and expanded therein for stablizing an electrical discharge in the gas in the discharge tube. The discharge tube of the invention can be smaller in diameter than prior discharge tubes.

BRIEF DESCRIPTION OF THE DRAWINGS

The invention will be described in further detail by way of example with reference to the accompanying drawings, in which.

DETAILED DESCRIPTION

Figure 1:
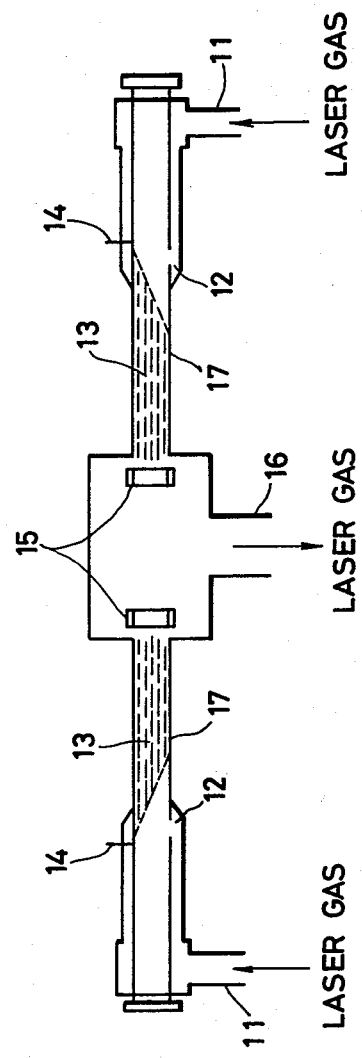
FIG. 1 is a schematic longitudinal cross-sectional view of a conventional coaxial-type carbon dioxide gas laser oscillator.

FIG. 1 shows a conventional coaxial-type carbon dioxide gas laser oscillator having a pair of gas inlets 11, 11 for introducing a gas medium such as a carbon dioxide gas through gaps 12, 12 into discharge areas 13 in a resonator of the laser oscillator. The laser oscillator also includes a pair of pin-shaped anode electrodes 14, 14 and a pair of cylindrical cathode electrodes 15, 15 for causing an electrical discharge in the carbon dioxide gas supplied therebetween. The carbon dioxide gas after being subjected to the discharge is fed out of the resonator through a gas outlet 16 positioned centrally of the laser oscillator. The gas inlets 11, 11 and the gaps 12, 12 jointly serve to disturbe the gas as supplied into the resonator for stabilizing the electrical discharge in the gas. With the cathode electrodes 14, 14 being pin-shaped and located outside of the resonator, there are areas in the discharge between the anode and cathode electrodes 14, 15, which areas fail to contribute to laser oscillation. More specifically, the pin-shaped anodes 14, 14 prevent the gas flow from being distributed symmetrically around an optical axis of the laser oscillator, resulting in a tendency to fail to achieve a fundamental mode while in operation.

The glow discharge extending fully in laser tubes 17, 17 in the vicinity of the cathodes 15, 15 is blown off by the laser gas circulating at a high speed in and out of the oscillator, a condition which causes the discharge area to be narrowed progressively toward the anodes 14, 14, as shown by the dotted lines in FIG. 1. In order to increase a laser output, it is necessary that the volume of a discharge area be increased. However, the pin-shaped anodes 14, 14 allow areas to be generated in the laser tubes, in which no discharge is created in the gas. Therefore, the prior construction as shown in FIG. 1 produces an output that undergoes a loss due to the presence of such ineffective areas, and hence fails to achieve a high performance.

The discharge tubes of the known laser oscillator are supplied with disturbed streams of gas in order to stabilize a glow discharge in the gas as the latter flows at a high speed. To prevent such disturbed gas streams from changing into stratified gas flows due to the discharge tubes' being large in diameter, there is required a large-sized gas blower for maintaining the gas flow properly disturbed. Such a large-sized gas blower has been a barrier to efforts to reducing the size of the overall laser apparatus.

Figure 2:
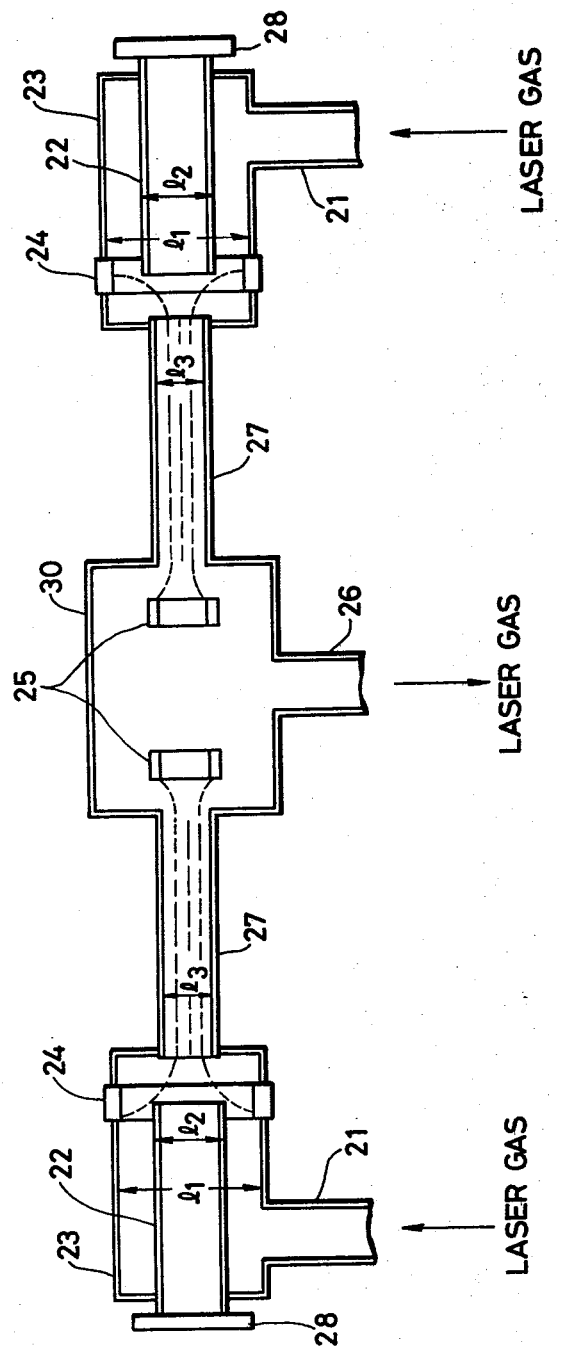
FIG. 2 is a schematic longitudinal cross-sectional view of a coaxial-type carbon dioxide gas laser oscillator according to the present invention.

FIG. 2 illustrates a coaxial-type carbon dioxide gas laser oscillator according to an embodiment of the present invention. The laser oscillator comprises a pair of gas inlets 21, 21 integral with a pair of cylindrical gas supply chambers 23, 23, respectively. Each of the gas supply chambers 23, 23 has a hollow cylindrical body 22 disposed coaxially therein for orientating a gas flow. Each cylindrical gas supply chamber 23 has an inside diameter of $l_1$ and each cylindrical body 22 has an outside diameter of $l_2$. The gas supply chambers 23, 23 have a pair of respective annular cathode electrodes 24, 24 extending partially around the distal ends of the cylindrical bodies 22, 22, respectively. The gas supply chambers 23, 23 are connected respectively to a pair of coaxial discharge tubes 27, 27 which extend away in concentric relation to the cylindrical bodies 22, 22 away therefrom and are joined to a central chamber 30. The central chamber 30 has therein a pair of annular anode electrodes 25, 25 disposed in coaxial relation to the discharge tubes 27, 27, and a central gas outlet 26. Each of the discharge tubes 27 has an inside diameter of $l_3$. The cylindrical bodies 22, 22 support a pair of mirrors respectively on their outer ends.

Laser gas is supplied through the gas inlets 21, 21 into the gas supply chambers 23, 23 in each of which the gas is forced to flow in a gap defined between the inner wall surface of the gas supply chamber 23 and the cylinder body 22. The gas is disturbed while flowing such a gap around the cylindrical body 22. The gas is then caused by the cylindrical body 22 to be orientated through the cathode 24 and a relatively wide space or cross-sectional area defined between the cylindrical body 22 and the discharge tube 27, and into the discharge tube 27 in which the anode and cathode 25, 24 cause an electric discharge in the gas. The gas which is heated by the discharge therein is rapidly fed through the anodes 25 in the central chamber 30, and then out of the central chamber 30 via the gas outlet 26.

Figure 3:
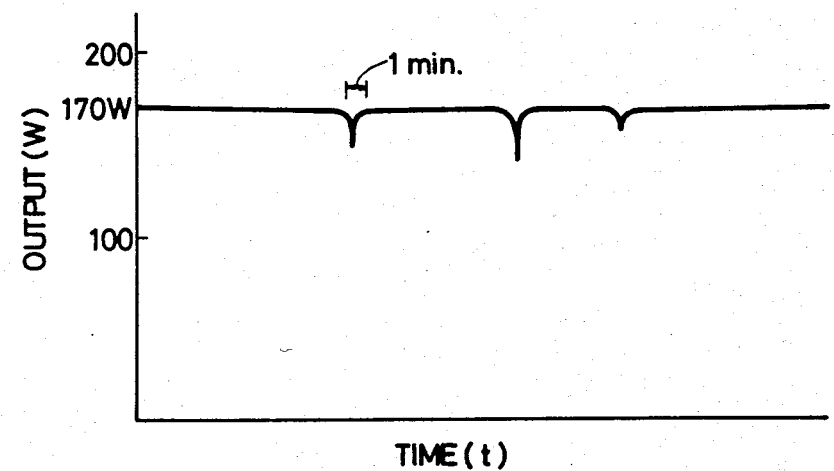
FIGS. 3 and 4 are graphs showing output characteristics of the laser oscillator of the present invention.

As an example, each of the gas supply chambers 23, 23 was made of metal and its inside diameter $l_1$ was 26 mm. Each of the cylindrical bodies 22, 22 was made of glass with the outside diameter $l_2$ being 20 mm. Each discharge tube 27, 27 was made of glass and had a length of 50 cm with the inside diameter $l_3$ being 12.6 mm. The laser oscillator of such a construction generated an output of 170 watts in a TEM$_{00}$ mode. The output as it varies with time is shown in FIG. 3. In this example, the inside diameter $l_3$ of the discharge tube 27 was selected to be smaller than the outside diameter $l_2$ of the cylindrical body 22 to maintain a disturbed gas flow in the discharged tube 27, there being no neccesity of providing a large-sized gas blower for generating a stable high output. A study of the graph of FIG. 3 indicates that the electrical discharge in the gas is not fully stabilized in that the laser output is dropped at certain intervals, and each output drop continues for about one minute.

Figure 4:
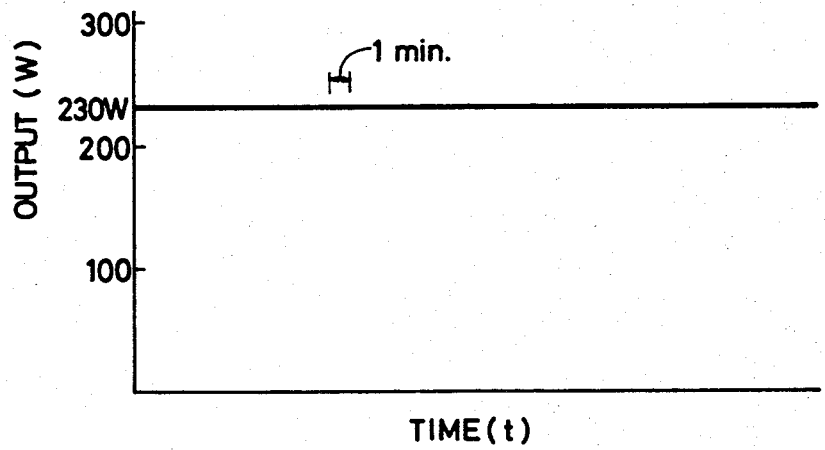

According to another example, such output variations could be eliminated by constructing the laser oscillator as follows: Each of the gas supply chambers was made of metal and the inside diameter $l_1$ thereof was 26 mm. Each cylindrical body 22 was made of glass with the inside diameter $l_3$ being 22 mm. Each discharge tube 27 was made of glass and the inside diameter $l_3$ was 15.6 mm, the discharge tube 27 being 50 cm long. The laser oscillator of such dimensions was able to produce an output of 230 watts in a main TEM$_{00}$ mode including a TEM$_{10}$. FIG. 4 shows such a laser output as it varies with time. The output had a stability which is subjected to a fluctuation of ±1%, a stability that is five times better than that of conventional laser oscillators.

With the illustrated embodiment of the invention, the outside diameter $l_2$ of the cylindrical body 22 is selected to be larger than the inside diameter $l_3$, and the latter is selected such that the cross-sectional area of the discharge tube 27 as expressed by $\pi/4 \cdot l_3^2$ is larger than the cross-sectional area of the gap between the inner wall surface of the gas supply chamber 23 and the cylindrical body 22 as given by the expression of $\pi/4 \cdot (l_1^2 - l_2^2)$, that is, the diameters $l_1$, $l_2$, $l_3$ are selected so as to satisfy the following relationship:

$$\sqrt{(l_1 - l_2)(l_1 + l_2)} < l_3 < l_2$$

The laser oscillator thus constructed can achieve a high performance and a stabilized discharge in the carbon dioxide gas. The laser oscillator of the above embodiment is also advantageous in that the annular electrodes 24, 25 can create a uniform discharge in the gas as shown in FIG. 2, resulting in a capability for the laser oscillator to operate in a single fundamental mode.

One of the factors which will render the gas discharge unstable in considered to be a rise in temperature of molecules which are responsible for the gas discharge. The laser oscillator according to the illustrated embodiment uses a laser gas composed of $N_2$, $H_e$ and $CO_2$. The gas discharge in the vicinity of the cathodes 24, 24 is mainly carried out by $N_2$ and $H_e$ in the gas supplied into the laser discharge tubes 27. Our experience shows that the discharge stability in the gas flowing at a high speed is largely dependent on the condition in which the discharge takes place in areas adjacent to the cathodes 24, 24. The discharge in the gas can be rendered stable by stabilizing the discharge in the vicinity of the cathodes 24, 24, that is, by cooling the molecules of $N_2$ and $H_e$ which have been excited. By suitably selecting the diameters $l_1$, $l_2$, $l_3$ according to the present invention, the gas which flows rapidly in the oscillator can be cooled for stabilization by way of thermal insulation and expansion of the gas as it travels from the gas supply chambers 23 into the gas discharge tubes 27.

Figure 5:
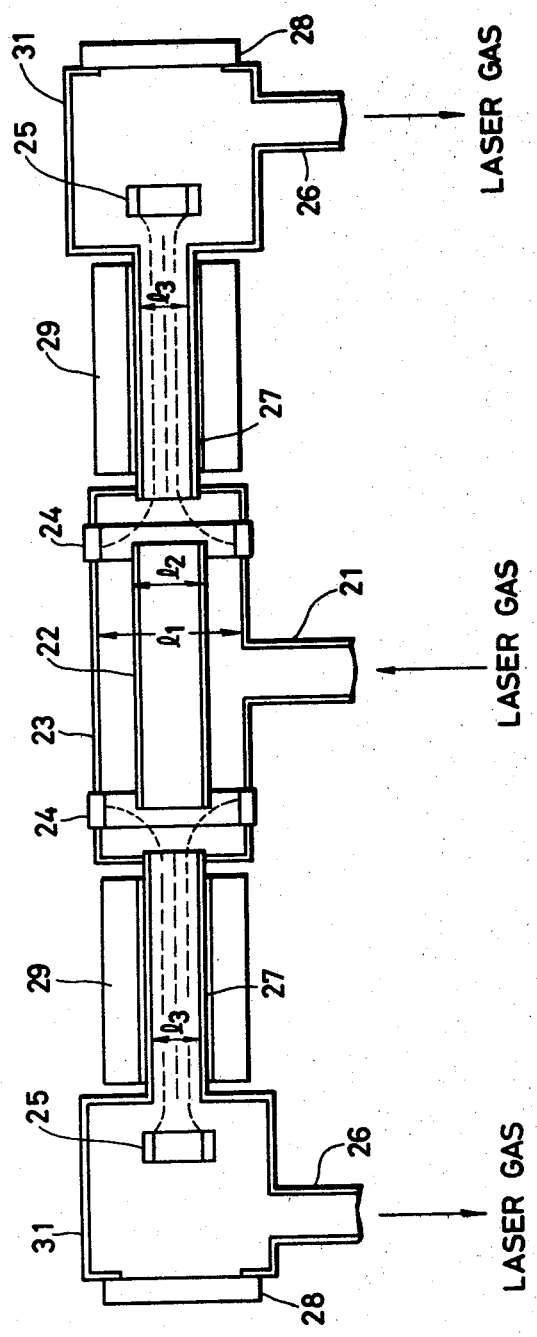
FIG. 5 is a schematic longitudinal cross-sectional view of a coaxial-type carbon dioxide gas laser oscilaotr according to another embodiment of the present invention.

According to another embodiment illustrated in FIG. 5, laser gas is introduced through a central gas inlet 21 into a central gas supply chamber 23, in which the gas is disturbed by a hollow cylindrical body 22 and orientated thereby to flow in opposite directions into a pair of gas discharge tubes 27, 27, while at the same time the gas is thermally insulated and expanded. The central gas supply chamber 23 supports thereon a pair of anodes 24, 24. The gas discharges tubes 27, 27 are integrally joined to a pair of chambers having respectively therein a pair of cathodes 25, 25, a pair of gas outlets 26, 26, and a pair of mirrors 28, 28. With the construction illustrated, there is no danger of accidental electrical discharges in the gas flowing between the anodes 24, 24 a gas blower (not shown) connected to the gas outlets 26, 26 since the discharge tends to be displaced in the direction of flow of the gas, and hence an electrically insulating arrangement for the laser oscillator is relatively simple.

The laser oscillator as shown in FIG. 5 also includes a pair of coolers 29, 29 disposed around the gas discharge tubes 27, 27, respectively, the coolers 29, 29 being preferably of the type which uses oil as a cooling medium. While such coolers 29, 29 may be dispensed with, they should be included for the best results.

Although certain preferred embodiments have been shown and described in detail, it should be understood that various changes and modifications may be made therein without departing from the scope of the appended claims. For examle, the laser oscillator shown in FIG. 2 may be equipped with coolers similar to the coolers 29, 29 illustrated in FIG. 5. While in the illustrated embodiments the laser oscillators are symmetrical with respect to the longitudinal center, they may be asymmetrical in shape. The laser oscillator could effectively work if it had only one gas discharge tube, a single pair of anode and cathode electrodes, a single pair of gas inlet and outlet, and a single pair of chambers connected to the gas inlet and outlet. Furthermore, the electrodes 24, 24 which are separate from the gas supply chamber or chambers 23 may be dispensed with, and the gas supply chamber or chambers 23 may be constructed of metal so that they can perform the function of the electrodes 24, 24. The anodes and cathodes may be switched around. The discharge tubes, the gas supply chambers, and the bodies for orientating the gas flow may be varied in cross section for better results.

What is claimed is:

1. A coaxial-type carbon dioxide gas laser oscillator, including;
   a discharge tube having an axis substantially aligned with an optical axis of the laser oscillator;
   a gas inlet disposed at one end of said discharge tube introducing gas into said discharge tube;
   a gas outlet disposed at the other end of said discharge tube drawing the gas out of said discharge tube;
   a gas supply chamber connected to and between said discharge tube and said gas inlet;
   a pair of annular electrodes disposed at opposite ends of said discharge tube and generating an electrical discharge in the gas in said discharge tube;
   means mounted in said gas supply chamber coaxially with said discharge tube for orientating the gas fed from said gas inlet via said gas supply chamber toward said discharge tube;
   said means having an outer wall surface and said gas supply chamber having an inner wall surface, said outer and inner wall surfaces jointly defining a gap for passage therethrough of the gas from said gas inlet, said gas supply chamber including a space having a larger cross-sectional area than that of said gap allowing the gas to flow from said gap through said space into said discharge tube; and
   said discharge tube having an inside cross-sectional area smaller than an outside cross-sectional area of said means and larger than said cross-sectional area of said gap.

2. A coaxial-type carbon dioxide gas laser oscillator according to claim 1, wherein said means comprises a hollow cylindrical body disposed in said gas supply chamber in coaxial alignment with said gas supply chamber and said discharge tube.

3. A coaxial-type carbon dioxide gas laser oscillator according to claim 2, wherein one of said annular electrodes located adjacent to one end of said discharge tube is disposed coaxially with said hollow cylindrical body and said discharge tube.

4. A coaxial-type carbon dioxide gas laser oscillator according to claim 2, wherein said space is defined between said one end of said discharge tube and said hollow cylindrical body.

5. A coaxial-type carbon dioxide gas laser oscillator according to claim 1, further including thermal means disposed around said discharge tube for cooling said discharge tube.

6. A coaxial-type carbon dioxide gas laser oscillator, including:
   a pair of first and second coaxial discharge tubes;
   a central chamber connected to and between said first and second discharge tubes;
   a pair of gas supply chambers connected respectively to said first and second discharge tubes remotely from said central chamber;
   a pair of first and second gas inlets connected to said first and second gas supply chambers, respectively, for supplying gas through said first and second gas supply chambers into said first and second discharge tubes;
   a gas outlet connected to said central chamber drawing the gas out of said central chamber;
   a first pair of electrodes mounted on said first gas supply chamber and in said central chamber, respectively, causing an electrical discharge in the gas in said first discharge tube;
   a second pair of electrodes mounted on said second gas supply chamber and in said central chamber, respectively, causing an electrical discharge in the gas in said second discharge tube;
   a pair of first and second hollow cylindrical bodies mounted coaxially respectively in said first and second gas supply chambers orientating the gas from said first and second gas inlets through said first and second gas supply chambers toward said first and second discharge tubes, respectively;
   each of said first and second hollow cylindrical bodies having an outer wall surface and each of said first and second gas supply chambers having an inner wall surface, said outer and inner wall surfaces jointly defining a gap for passage therethrough of the gas from one of said gas inlets, each said gas supply chamber including a space having a larger cross-sectional area than that of said gap allowing the gas to flow from said gap through said space into one of said discharge tubes; and
   said discharge tube having an inside cross-sectional area smaller than an outside cross-sectional area of said hollow cylindrical body and larger than said cross-sectional area of said gap.

7. A coaxial-type carbon dioxide gas laser oscillator according to claim 6, wherein one of said first pair of electrodes mounted on said first gas supply chamber is coaxial with said first hollow cylindrical body and said discharge tube.

8. A coaxial-type carbon dioxide gas laser oscillator according to claim 6, wherein one of said second pair of electrodes mounted on said second gas supply chamber is coaxial with said second hollow cylindrical body and said discharge tube.

9. A coaxial-type carbon dioxide gas laser oscillator according to claim 6, wherein said gap is defined between each of said first and second hollow cylindrical bodies and a corresponding one of said first and second discharge tubes.

10. A coaxial-type carbon dioxide gas laser oscillator, comprising:

a pair of first and second coaxial discharge tubes;

a central gas supply chamber connected to and between said first and second discharge tubes;

a pair of first and second chambers connected respectively to said first and second discharge tubes remotely from said central gas supply chamber;

a gas inlet connected to said central gas supply chamber supplying gas through said inlet into said first and second discharge tubes;

a pair of first and second gas outlets connected respectively to said first and second chambers drawing the gas from said first and second discharge tubes through said first and second chambers;

a first pair of electrodes mounted on said first chamber and in said central chamber, respectively, causing an electrical discharge in the gas in said first discharge tube;

a second pair of electrodes mounted on said second chamber and in said central chamber, respectively, causing an electrical discharge in the gas in said second discharge tube;

a hollow cylindrical body mounted coaxially in said central gas supply chamber orientating the gas from said gas inlet through said central gas supply chamber toward said first and second discharge tubes, respectively;

said hollow cylindrical body having an outer wall surface and said central gas supply chamber having an inner wall surface, said outer and inner wall surfaces jointly defining a gap for passage therethrough of the gas from said gas inlet, said gas supply chamber including a pair of first and second spaces each having a larger cross-sectional area than that of said gap for allowing the gas to flow from said gap through said space into one of said discharge tubes; and said discharge tube having an inside cross-sectional area smaller than an outside cross-sectional area of said hollow cylindrical body and larger than said cross-sectional area of said gap.

11. A coaxial-type carbon dioxide gas laser oscillator according to claim 10, wherein one of said first pair of electrodes mounted on said first chamber is coaxial with said hollow cylindrical body and said discharge tube.

12. A coaxial-type carbon dioxide gas laser oscillator according to claim 10, wherein one of said second pair of electrodes mounted on said second chamber is coaxial with said hollow cylindrical body and said discharge tube.

13. A coaxial-type carbon dioxide gas laser oscillator according to claim 10, wherein said gap is defined between each of said hollow cylindrical body and a corresponding one of said first and second discharge tubes.

14. A coaxial-type carbon dioxide gas laser oscillator according to claim 10, wherein the relationship of the cross-sectional area of said gas supply chamber to the cross-sectional area of said means mounted in the gas supply chamber for orientating the gas fed from the gas inlet via said gas supply chamber toward said discharge tube is expressed by the following equation:

$$\sqrt{(l_1 - l_2)(l_1 + l_2)} < l_3 < l_2$$

wherein $l_1$ is the inside diameter of the gas supply chamber, $l_2$ is the outside diameter and $l_3$ is the inside diameter of said means.

15. A coaxial-type carbon dioxide gas laser oscillator according to claim 1, wherein the relationship of the cross-sectional to claim 1, wherein the relationship of the cross-sectional area of said gas supply chamber to the cross-sectional area of said means mounted in the gas supply chamber for orientating the gas fed from the gas inlet via said gas supply chamber toward said discharge tube is expressed by the following equation:

$$\sqrt{(l_1 - l_2)(l_1 + l_2)} < l_3 < l_2$$

wherein $l_1$ is the inside diameter of the gas supply chamber, $l_2$ is the outside diameter and $l_3$ is the inside diameter of said means.

* * * * *

UNITED STATES PATENT AND TRADEMARK OFFICE
CERTIFICATE OF CORRECTION

PATENT NO. : 4,470,144
DATED : September 4, 1984
INVENTOR(S) : Reiji SANO et al

It is certified that error appears in the above-identified patent and that said Letters Patent is hereby corrected as shown below:

Cover page, item [30], (Foreign Application Priority Data), please change "May 18, 1982" to --May 18, 1981--.

Signed and Sealed this

Twenty-sixth Day of February 1985

[SEAL]

Attest:

DONALD J. QUIGG

Attesting Officer

Acting Commissioner of Patents and Trademarks